US009609103B2

(12) United States Patent
Calle

(10) Patent No.: US 9,609,103 B2
(45) Date of Patent: Mar. 28, 2017

(54) SYSTEMS AND METHODS FOR MANAGING COMMUNICATION

(71) Applicant: Christopher Andrew Calle, Dallas, TX (US)

(72) Inventor: Christopher Andrew Calle, Dallas, TX (US)

(*) Notice: Subject to any disclaimer, the term of this patent is extended or adjusted under 35 U.S.C. 154(b) by 182 days.

(21) Appl. No.: 14/315,159

(22) Filed: Jun. 25, 2014

(65) Prior Publication Data

US 2014/0380212 A1    Dec. 25, 2014

Related U.S. Application Data

(60) Provisional application No. 61/957,103, filed on Jun. 25, 2013.

(51) Int. Cl.
| | | |
|---|---|---|
| G06F 15/00 | (2006.01) | |
| G06F 13/00 | (2006.01) | |
| H04M 1/2745 | (2006.01) | |
| G06Q 50/00 | (2012.01) | |
| H04M 1/725 | (2006.01) | |
| G06Q 10/10 | (2012.01) | |

(52) U.S. Cl.
CPC .......... *H04M 1/2745* (2013.01); *G06Q 10/10* (2013.01); *G06Q 10/107* (2013.01); *G06Q 50/01* (2013.01); *H04M 1/72566* (2013.01)

(58) Field of Classification Search
CPC .................. G06Q 10/107; H04L 29/06027
USPC ......... 715/752, 763–765, 851–853, 740–743
See application file for complete search history.

(56) References Cited

U.S. PATENT DOCUMENTS

| | | |
|---|---|---|
| 4,782,521 A | 11/1988 | Bartlett et al. |
| 5,625,683 A | 4/1997 | Nazanin et al. |
| 7,155,002 B2 | 12/2006 | Hagiwara |
| 7,684,552 B2 | 3/2010 | Pomerantz et al. |
| 8,208,619 B2 | 6/2012 | Perrin et al. |
| 8,243,724 B2 | 8/2012 | Meriaz et al. |
| 8,458,001 B2 | 6/2013 | Gerlach et al. |
| 8,582,743 B2* | 11/2013 | Teng ............ G06Q 10/109 370/260 |
| 2004/0148351 A1* | 7/2004 | Cotte ............ H04L 29/06027 709/205 |
| 2007/0093235 A1 | 4/2007 | Kimbrell |
| 2008/0214245 A1 | 9/2008 | Kwon |
| 2009/0170492 A1 | 7/2009 | Lee |
| 2013/0097527 A1* | 4/2013 | Scott ............ G06Q 10/107 715/752 |

* cited by examiner

*Primary Examiner* — Kevin Nguyen
(74) *Attorney, Agent, or Firm* — Lightfoot & Alford PLLC

(57) ABSTRACT

A method includes providing a contact list comprising a plurality of contacts and in response to at least one of (1) occurrence of a predetermined time and (2) receiving a manual initiation input, presenting at least one communication option of a first contact of the plurality of contacts selected from the contact list. The plurality of contacts is not presented during the period of time between the occurrence of the predetermined time and the presenting of the at least one communication option of the first contact.

12 Claims, 3 Drawing Sheets

SYSTEMS AND METHODS FOR MANAGING COMMUNICATION

CROSS-REFERENCE TO RELATED APPLICATIONS

The present application claims priority to U.S. Provisional Patent Application No. 61/957,103, filed on Jun. 25, 2013 by Christopher Andrew Calle, entitled "Call someone, a smartphone utility," which is incorporated by reference herein as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more aspects of the present disclosure are provided below, the disclosed systems and/or methods may be implemented using any number of techniques, whether currently known or developed in the future. The disclosure should in no way be limited to the illustrative implementations, drawings, and techniques illustrated below, including the example designs and implementations illustrated and described herein, but may be modified within the scope of the appended claims along with their full scope of equivalents.

Some embodiments of the present disclosure provide systems and methods for managing communication with a contact. More specifically, this disclosure provides systems and methods that may be utilized to effectively manage and/or increase a frequency of communication attempts from a user of the systems and methods disclosed herein with a contact via communications options of the contact. In some cases, a contact may comprise a computer or database record associated with a person, business, or the like and communication options of a contact may comprise telephone numbers, SMS text messaging numbers, email addresses, instant messaging addresses, and/or any other type of electronic communication identifier associated with the contact. Most generally, the systems and methods disclosed herein may allow a user of the systems and methods disclosed herein to prevent losing touch or otherwise allow a frequency of attempting to communicate with a contact to increase unimpeded.

In some cases, the systems and methods disclosed herein may, after some configuration by the user, automatically prompt the user to initiate communication with contacts of a contact list in a manner that prevents a contacts form going unsolicited for communication for relatively longer periods than other contacts of the contact list. In some embodiments, a user may manually override and/or ignore prompts that encourage or remind a user to initiate an attempt to communicate with contacts of a contact list. In some embodiments, a contact list may be associated with a list rules configured to at least initially treat contacts of the contact list with substantially equal likelihood of having their associated communication options presented to a user for selection and resultant initiation of communication between the user and the contact. As such, in some cases, the systems and methods may be conceptualized as treating all of the contacts of a contact list as being generally equally important to a user with regard to maintaining efforts to communicate with the contacts.

Figure 1:
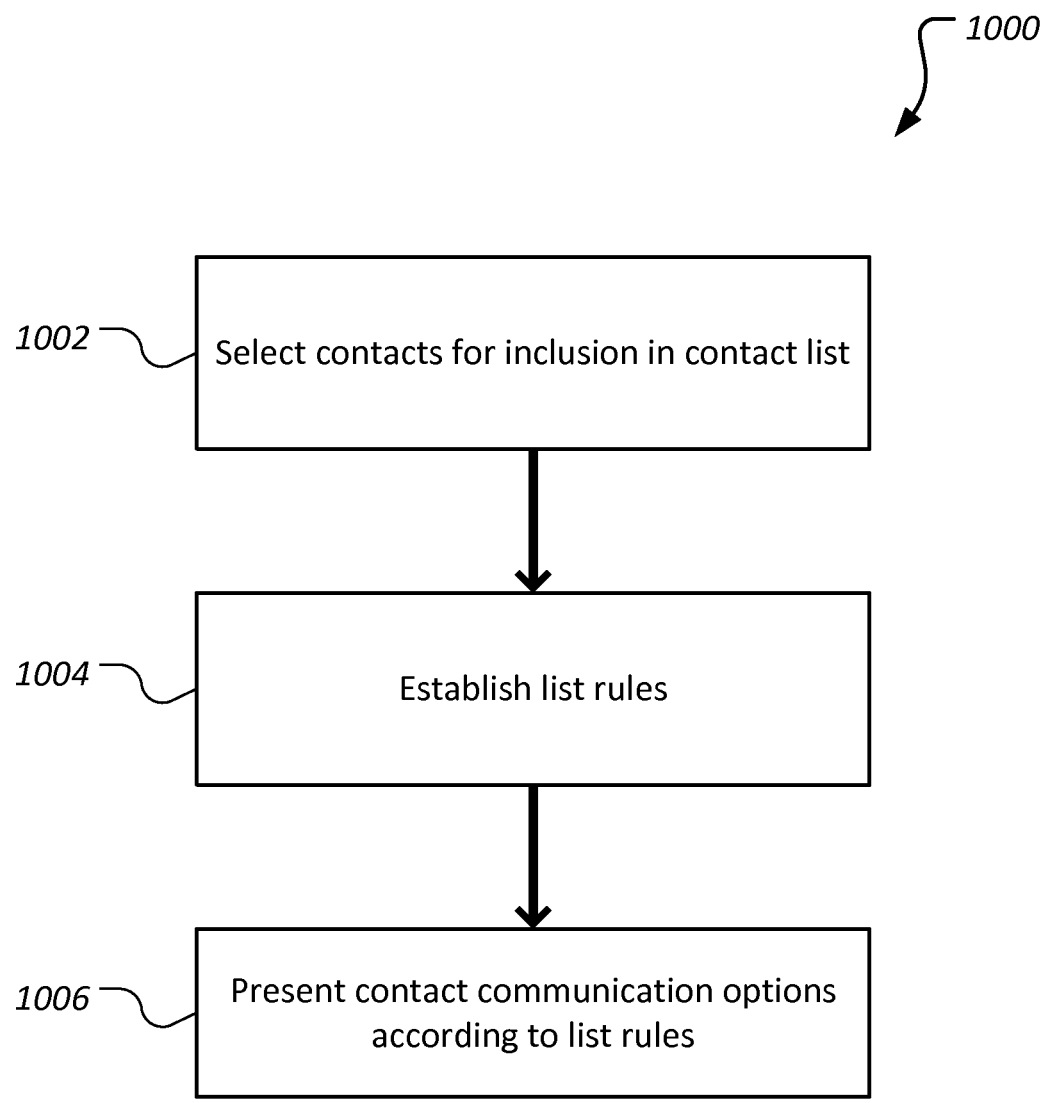
FIG. 1 is a flowchart that illustrates a method of the disclosure.

Referring now to FIG. 1, a flowchart of a method 1000 is shown. The method 1000 may begin at block 1002 by selecting contacts for inclusion in a contact list. In some embodiments, the contacts may comprise information representative of people, businesses, and/or the like and the contacts may further comprise communication options such as telephone numbers, SMS text messaging numbers, email addresses, instant messaging addresses, and/or any other type of electronic communication identifier associated with the contact. In some cases, the selecting contacts of block 1002 may comprise a user flagging, toggling, checking, highlighting, and/or otherwise making a selection regarding whether an existing contact and/or communication option should be included in the contact list. In some cases, a contact and/or a communication option for a new or unknown contact may be added to the contact list in response to a user flagging, toggling, checking, highlighting, and/or otherwise making a selection regarding whether information related to an incoming communication option communication attempt should be added to the contact list. For example, in response to an incoming phone call, a smartphone implementing and/or executing the method 1000 may present the contact (caller's identity) and/or associated incoming communication option (caller's telephone number) and allow the user to with as little as a single actuation of keyboard, touchscreen, and/or similar input cause the contact and/or communication option to be added to the contact list. In other cases, preexisting sets of contacts (contact databases whether housed on a smartphone, remotely, and/or in a cloud storage device) may be viewed by a user so that flagging, toggling, checking, highlighting, and/or otherwise making a selection regarding whether an existing contact and/or communication option should be included in the contact list may be accomplished by the user via one or more actuations of a keyboard, touchscreen, and/or similar input to cause the contact and/or communication option to be added to the contact list. Regardless the source of the contact and/or communication options of the contact, block 1002 results in a contact list comprising at least two contacts with each contact being associated with and/or comprising at least one communication option. The method 1000 may progress to block 1004 where the method 1000 establishes a list of rules for application to the contact list selected at block 1002.

In some cases, method 1000 may proceed at block 1004 by allowing a user to select in what manner contacts and/or communication options of contacts may be selected for presentation to a user as a prompt for selectively attempting to initiate communication with a contact using a communication option of the selected contact. In some embodiments, a user may be prompted to select an alphanumeric sorting based contact selection methodology in which contacts may be selected for presentation to a user based on, for example, alphabetical order of the contacts. As such, in some cases, a contact may be automatically selected (upon initiation of application of the rules to the contact list) prior to another contact because the contact comprises a name or other alphanumeric identifier relatively higher in alphanumeric placement relative to the other contact. In alternative embodiments, a contact may be automatically selected (upon initiation of application of the rules to the contact list) at least partially based on a randomized order of the contacts of the contact list. In some embodiments, the rules selected and/or required to be applied to the contact list may comprise a tracking or ordering of the contacts based on when a user or device most recently attempted to initiate communication with a contact using the contact's communications options. In alternative embodiments, the rules selected and/or required to be applied to the contact list may comprise a tracking or ordering of the contacts based on when a user or device most recently successfully communicated with a contact using the contact's communications options. In some cases, a contact may be flagged or otherwise denoted as temporarily disqualified from presentation as a result of successfully attempting to initiate communication with the contact and/or successfully communicating with the contact until one or more (or all) of the other non-disqualified contacts have had similar success. As such, in some cases, a user may select that a so-called "slimming" functionality be applied to a contact list so that contacts may not be overlooked, skipped, and/or otherwise caused by a user to be less likely to be selected for presentation to a user. In some cases, presenting a contact to a user comprises displaying one or more communication options on a touchscreen display/input device so that virtual buttons associated with the communications options are available for as little as one touch actuation that results in an attempt for a smartphone to initiate communication with the selected contact utilizing the selected communication option.

In some cases, the list rules may be applied through the use of an alarm and/or timer configured to cause selection of a contact at a predetermined time on a repeating basis and/or at the expiration of a predetermine length of time. In some embodiments, no alarm and/or timer may be set and a user may provide a manual initiation input to apply the list rules to select a contact without substantial delay after the manual initiation input is provided to a device such as a smartphone. In other cases, the above-described alarms and/or timers may be operative even while a user provides a manual initiation input to apply the list rules to select a contact for presentation before the alarms and/or timers themselves cause selection and presentation of a next presented contact. In other words, the list rules may be selected by a user to be inactive, active in a manner configured to present a contact according to predetermined time, and/or active on demand in response to the above-described manual initiation input.

The method 1000 may continue at block 1006 by applying, regardless of the type of temporal trigger (alarm, timer, manual initiation, etc.) the list rules selected or automatically provided at block 1004 to the contact list discussed with regard to block 1002 and presenting a contact communication option for a contact selected as a function of the list rules. In response to the presentation of the communication option for the presented contact, a user may select the communication option by which the user prefers to attempt to initiate communication with the displayed contact. In some embodiments, a user may be presented with an option to decline to select any of the communication options of the presented contact. It will be appreciated that in some embodiments, the unselected contacts of the contact list are not presented between the period of time the selected contact is selected for presentation according the list rules and the time the communication options of the selected contact are presented for optional selection by a user to initiate an attempt to communicate with the presented contact. In other words, a user need not be bothered by manually revisiting a list of multiple contacts and choosing which one to attempt communication with next. Instead, the systems and methods disclosed herein provide a convenient manner in which once a contact list is built by a user, the user need only responds to presented contact communication options to ensure that the user is diligently attempting to remain in communication with the contacts of the contact list with a desired frequency.

In some embodiments, multiple contact lists and/or multiple list rule sets may be generated. In some cases, the multiple contact lists may be acted on according to the multiple list rules serially and/or in parallel so that a user may be presented with opportunities communicate with contacts as desired.

Figure 2:
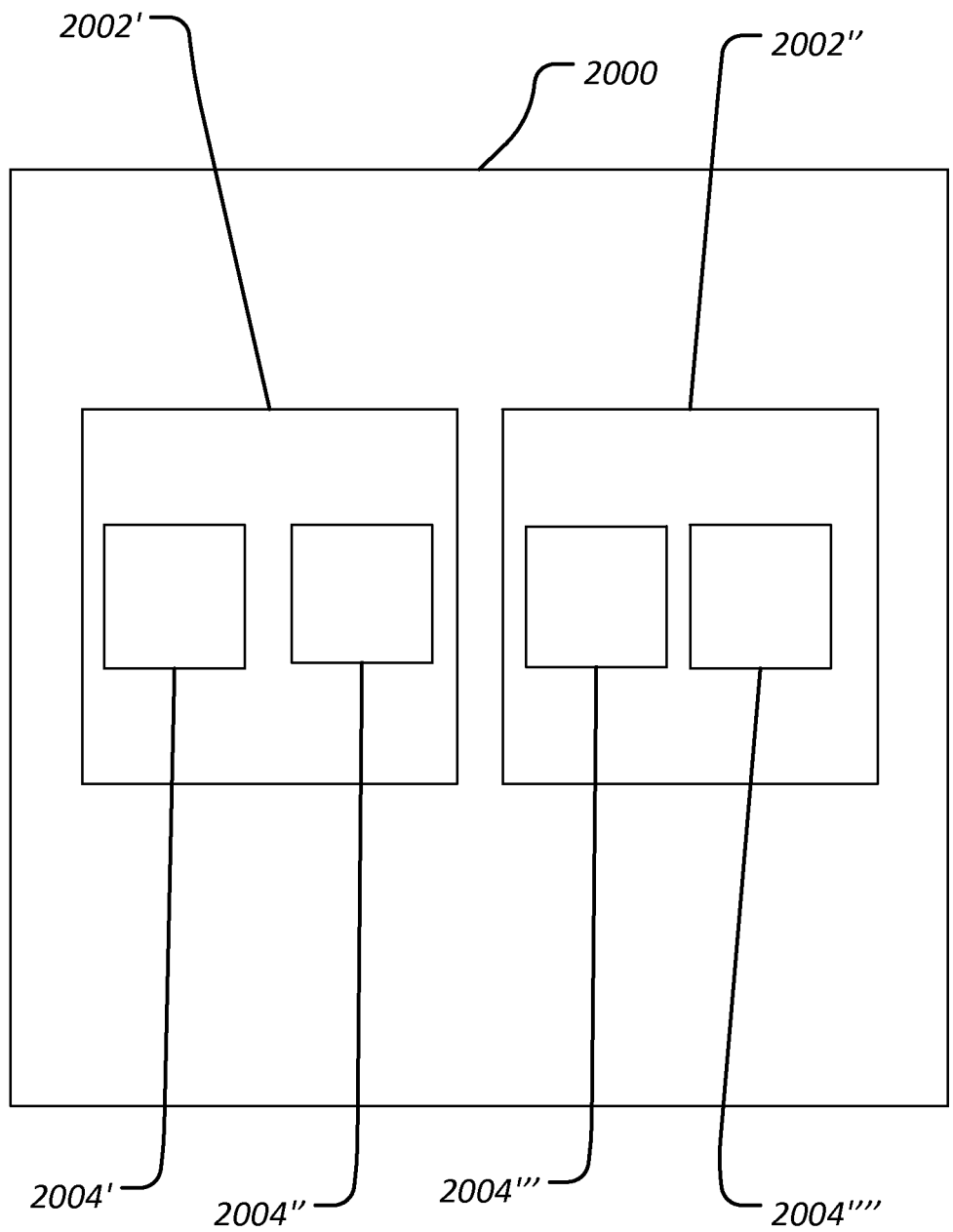
FIG. 2 is a schematic diagram of a contact of the disclosure.
Figure 3:
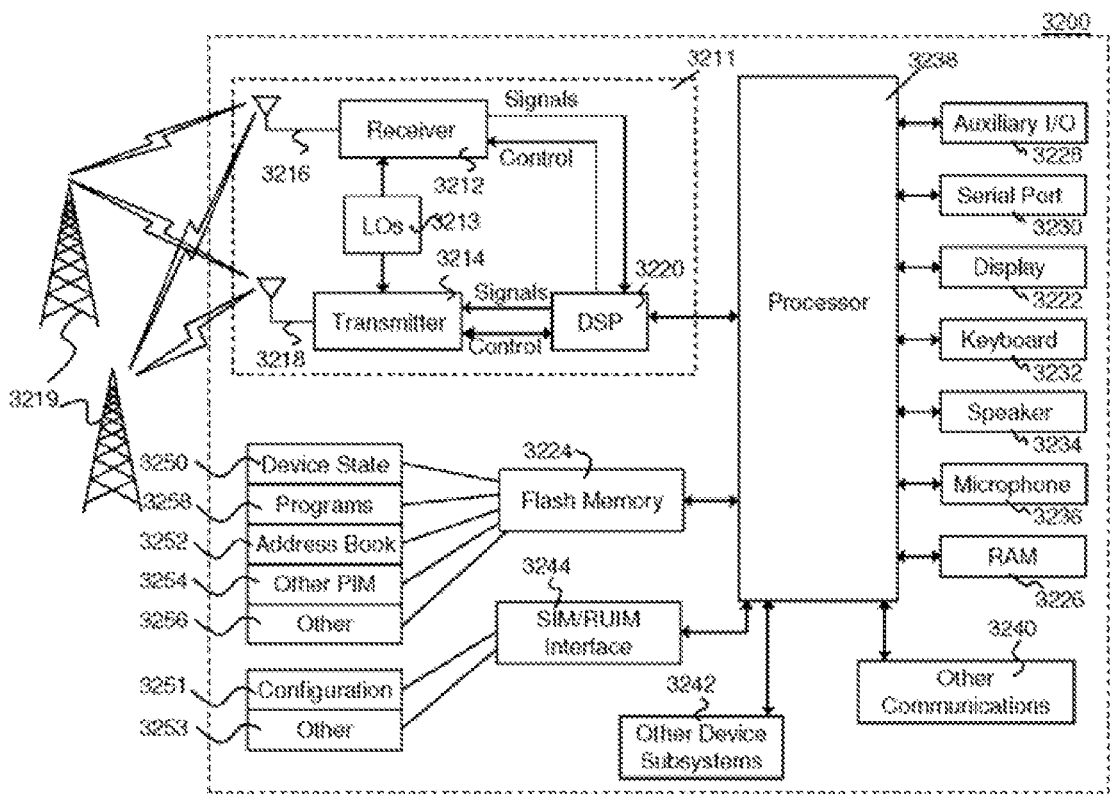
FIG. 3 illustrates a wireless device suitable for implementing the several aspects of the present disclosure.

Referring now to FIG. 2, a schematic diagram of a contact list 2000 is shown. Contact list 2000 comprises a first contact 2002' and a second contact 2002". The first contact 2002' comprises a first communication option 2004' and a second communication option 2004". The second contact 2002" comprises a third communication option 2004''' and a fourth communication option 2004"". In some embodiments, the contact list 2000 comprises a set of contacts selected from a preexisting database of contacts and/or a set of contacts individually added directly to the contact list via a selection process as described above with regard to block 1002 of method 1000. First communication option 2004' of first contact 2002' may comprise a telephone number while second communication option 2004" may comprise another telephone number or any other suitable electronic address associated with communicating with the first contact 2002'. Similarly, third communication option 2004''' of second contact 2002" may comprise a telephone number while fourth communication option 2004"" may comprise another telephone number or any other suitable electronic address associated with communicating with the second contact 2002". Of course, in alternative embodiments, the communications options 2004 may comprise any type of electronic address associated with communicating with their associated contacts 2002.

As mentioned above, the embodiments described herein may be implemented by mobile telephones, personal digital assistants, handheld computers, laptop computers, tablet computers, or other types of devices. An example of such a device is described below with regard to FIG. 7. Device 3200 may comprise a two-way wireless communication device having voice and data communication capabilities. In some embodiments, voice communication capabilities are optional. The device 3200 generally has the capability to communicate with other computer systems on the Internet. Depending on the exact functionality provided, the device may be referred to as a data messaging device, a two-way pager, a wireless e-mail device, a cellular telephone with data messaging capabilities, a wireless Internet appliance, a wireless device, a smart phone, a mobile device, or a data communication device, as examples.

Where the device 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. The particular design of the communication subsystem 3211 may be dependent upon the communication network in which the device 3200 is intended to operate. While only two antenna elements 3216 and 3218 are shown, multiple antennas may be present, as described herein.

Network access requirements may also vary depending upon the type of network 3219. In some networks, network access is associated with a subscriber or user of the device 3200. The device 3200 may require a removable user identity module (RUIM) or a subscriber identity module (SIM) card in order to operate on a network. The SIM/RUIM interface 3244 is typically similar to a card slot into which a SIM/RUIM card may be inserted. The SIM/RUIM card may have memory and may hold many key configurations 3251 and other information 3253, such as identification and subscriber-related information.

When required network registration or activation procedures have been completed, the device 3200 may send and receive communication signals over the network 3219. As illustrated, the network 3219 may consist of multiple base stations communicating with the device 3200.

Signals received by antenna 3216 through communication network 3219 are input to receiver 3212, which may perform such common receiver functions as signal amplification, frequency down conversion, filtering, channel selection, and the like. Analog to digital (A/D) conversion of a received signal allows more complex communication functions, such as demodulation and decoding to be performed in the DSP 3220. In a similar manner, signals to be transmitted are processed, including modulation and encoding for example, by DSP 3220 and are input to transmitter 3214 for digital to analog (D/A) conversion, frequency up conversion, filtering, amplification, and transmission over the communication network 3219 via antenna 3218. DSP 3220 not only processes communication signals but also provides for receiver and transmitter control. For example, the gains applied to communication signals in receiver 3212 and transmitter 3214 may be adaptively controlled through automatic gain control algorithms implemented in DSP 3220.

The device 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem, and any other device subsystems generally designated as 3242. Serial port 3230 may include a USB port or other port currently known or developed in the future.

Some of the illustrated subsystems perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions, such as a calculator or task list.

Operating system software used by the processor 3238 may be stored in a persistent store such as flash memory 3224, which may instead be a read-only memory (ROM) or similar storage element (not shown). The operating system, specific device applications, or parts thereof, may be temporarily loaded into a volatile memory such as RAM 3226. Received communication signals may also be stored in RAM 3226.

As shown, flash memory 3224 may be segregated into different areas for both computer programs 3258 and program data storage 3250, 3252, 3254 and 3256. These different storage types indicate that each program may allocate a portion of flash memory 3224 for their own data storage requirements. Processor 3238, in addition to its operating system functions, may enable execution of software applications on the device 3200. A predetermined set of applications that control basic operations, including at least data and voice communication applications for example, may typically be installed on the device 3200 during manufacturing. Other applications may be installed subsequently or dynamically.

Applications and software may be stored on any computer-readable storage medium. The computer-readable storage medium may be tangible or in a transitory/non-transitory medium such as optical (e.g., CD, DVD, etc.), magnetic (e.g., tape), or other memory currently known or developed in the future.

One software application may be a personal information manager (PIM) application having the ability to organize and manage data items relating to the user of the device such as, but not limited to, e-mail, calendar events, voice mails, appointments, and task items. One or more memory stores may be available on the device to facilitate storage of PIM data items. Such a PIM application may have the ability to send and receive data items via the wireless network 3219. Further applications may also be loaded onto the device 3200 through the network 3219, an auxiliary I/O subsystem 3228, serial port 3230, short-range communications subsystem 3240, or any other suitable subsystem 3242, and installed by a user in the RAM 3226 or a non-volatile store (not shown) for execution by the processor 3238. Such flexibility in application installation may increase the functionality of the device 3200 and may provide enhanced on-device functions, communication-related functions, or both. For example, secure communication applications may enable electronic commerce functions and other such financial transactions to be performed using the device 3200.

In a data communication mode, a received signal such as a text message or web page download may be processed by the communication subsystem 3211 and input to the processor 3238, which may further process the received signal for output to the display 3222, or alternatively to an auxiliary I/O device 3228.

A user of device 3200 may also compose data items, such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of the device 3200 is similar, except that received signals may typically be output to a speaker 3234 and signals for transmission may be generated by a microphone 3236. Alternative voice or audio I/O subsystems, such as a voice message recording subsystem, may also be implemented on the device 3200. Although voice or audio signal output may be accomplished primarily through the speaker 3234, display 3222 may also be used to provide an indication of the identity of a calling party, the duration of a voice call, or other voice call-related information, for example.

Serial port 3230 may be implemented in a personal digital assistant (PDA)-type device for which synchronization with a user's desktop computer (not shown) may be desirable, but such a port is an optional device component. Such a port 3230 may enable a user to set preferences through an external device or software application and may extend the capabilities of the device 3200 by providing for information or software downloads to the device 3200 other than through a wireless communication network. The alternate download path may, for example, be used to load an encryption key onto the device 3200 through a direct and thus reliable and trusted connection to thereby enable secure device communication. Serial port 3230 may further be used to connect the device to a computer to act as a modem.

Other communications subsystems 3240, such as a short-range communications subsystem, are further optional components which may provide for communication between the device 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi, WiMax, near field communication (NFC), and/or radio frequency identification (RFID). The other communications element 3240 may also be used to communicate with auxiliary devices such as tablet displays, keyboards or projectors. In some embodiments, contact lists 2000, contacts 2002, and/or communication options 2004 may be generated, managed, stored, transmitted, received, sorted, selected, communicated, shared, reproduced, utilized, and/or otherwise manipulated through the use of one or more of the components of the device 3200 in a manner selected and/or configured to accomplish and/or facilitate method 1000.

While several implementations have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

As used herein, terms such as "mobile handset", "wireless device", and the like may be used to refer to such devices, but it should be understood that the embodiments disclosed herein may be applicable to any type of device that may be configured to utilize the systems disclosed herein, even if the device is not transportable.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

What is claimed is:

1. A method, comprising:
   providing a contact list comprising a plurality of contacts; and
   in response to occurrence of a predetermined time, presenting at least one communication option of a first contact of the plurality of contacts selected from the contact list;
   wherein when the presenting of the at least one communication option of the first contact is in response to the occurrence of the predetermined time, the contact list is not presented during the period of time between the occurrence of the predetermined time and the presenting of the at least one communication option of the first contact; and
   after presenting the at least one communication option of the first contact, automatically presenting at least one communication option of a second contact of the plurality of contacts of the contact list in response to the occurrence of a second predetermined time without displaying the contact list, wherein the second contact is selected from the contact list based on an alphanumeric sorting of the plurality of contacts or is selected substantially randomly from the contact list.

2. The method of claim 1, wherein the at least one communication option comprises a telephone number.

3. The method of claim 1, wherein the predetermined time is associated with a repeating alarm.

4. The method of claim 1, wherein the predetermined time is associated with a timer.

5. The method of claim 1, wherein the first contact is selected from the contact list based on an alphanumeric sorting of the plurality of contacts.

6. The method of claim 1, wherein the first contact is selected substantially randomly from the contact list.

7. The method of claim 1, wherein the first contact is selected as a function of an elapsed time since a most recent presenting of the at least one communication option of the first contact that resulted from the occurrence of a predetermined time.

8. The method of claim 1, wherein a second presentation of the at least one communication option of the first contact is prevented until at least one of (1) at least one communication option of each of the plurality of contacts has been presented and (2) receiving a manual eligibility reset input for the first contact.

9. A device, comprising:
   a contact list comprising a plurality of contacts; and
   a processor configured to, in response to occurrence of a predetermined time, present at least one communication option of a first contact of the plurality of contacts selected from the contact list;
   wherein when the presenting of the at least one communication option of the first contact is in response to the occurrence of the predetermined time, the contact list is not presented during the period of time between the occurrence of the predetermined time and the presenting of the at least one communication option of the first contact; and
   after presenting the at least one communication option of the first contact, automatically presenting at least one communication option of a second contact of the plurality of contacts of the contact list in response to the occurrence of a second predetermined time without displaying the contact list, wherein the second contact is selected from the contact list based on an alphanumeric sorting of the plurality of contacts or is selected substantially randomly from the contact list.

10. The device of claim 9, further comprising a display configured to visually present the at least one communication option of the first contact.

11. The device of claim 9, further comprising a keyboard configured to receive the manual initiation input.

12. The device of claim 9, further comprising an address book configured to store the contact list.

* * * * *